United States Patent
Ehmke

(10) Patent No.: US 11,835,739 B2
(45) Date of Patent: Dec. 5, 2023

(54) DARK MIRROR THIN FILMS

(71) Applicant: TEXAS INSTRUMENTS INCORPORATED, Dallas, TX (US)

(72) Inventor: John Charles Ehmke, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 433 days.

(21) Appl. No.: 17/124,158

(22) Filed: Dec. 16, 2020

(65) Prior Publication Data

US 2021/0255372 A1    Aug. 19, 2021

Related U.S. Application Data

(60) Provisional application No. 62/976,460, filed on Feb. 14, 2020.

(51) Int. Cl.

| | |
|---|---|
| G02B 5/00 | (2006.01) |
| G02B 27/00 | (2006.01) |
| G02B 1/115 | (2015.01) |
| G02B 5/28 | (2006.01) |
| G02B 26/08 | (2006.01) |

(52) U.S. Cl.
CPC ............. G02B 5/003 (2013.01); G02B 1/115 (2013.01); G02B 5/285 (2013.01); G02B 27/0018 (2013.01); G02B 26/0833 (2013.01)

(58) Field of Classification Search
CPC ........ G02B 5/003; G02B 1/115; G02B 5/285; G02B 27/0018; G02B 26/0833; G02B 1/10; G02B 5/085; G02B 5/0855; G02B 5/0866; G02B 5/0875; G02B 5/286; G02B 5/288; G02B 1/116

See application file for complete search history.

(56) References Cited

U.S. PATENT DOCUMENTS

| | | | |
|---|---|---|---|
| 5,808,714 A | 9/1998 | Rowlands et al. | |
| 2006/0082859 A1* | 4/2006 | Huibers | G02B 26/0833 359/291 |
| 2011/0199684 A1 | 8/2011 | Hashimoto et al. | |
| 2019/0219843 A1* | 7/2019 | Ogo | G02B 1/115 |
| 2019/0242178 A1* | 8/2019 | Fisher | C03C 17/3649 |
| 2019/0258087 A1* | 8/2019 | Valentine | G02B 5/223 |

FOREIGN PATENT DOCUMENTS

CN    108193171 A  *  6/2018  ........... C23C 14/021

OTHER PUBLICATIONS

Machine translation of CN 108193171 A (Year: 2018).*

* cited by examiner

*Primary Examiner* — Darryl J Collins
*Assistant Examiner* — Matthew Y Lee
(74) *Attorney, Agent, or Firm* — Michelle F. Murray; Frank D. Cimino

(57) ABSTRACT

A system includes an optical film stack, where the optical film stack includes a substrate and a first inorganic layer on the substrate. The optical film stack also includes a first dielectric layer on the first inorganic layer and a first metal layer on the first dielectric layer. The optical film stack also includes a second dielectric layer on the first metal layer and a second inorganic layer on the second dielectric layer. The optical film stack also includes a second metal layer on the second inorganic layer.

20 Claims, 4 Drawing Sheets

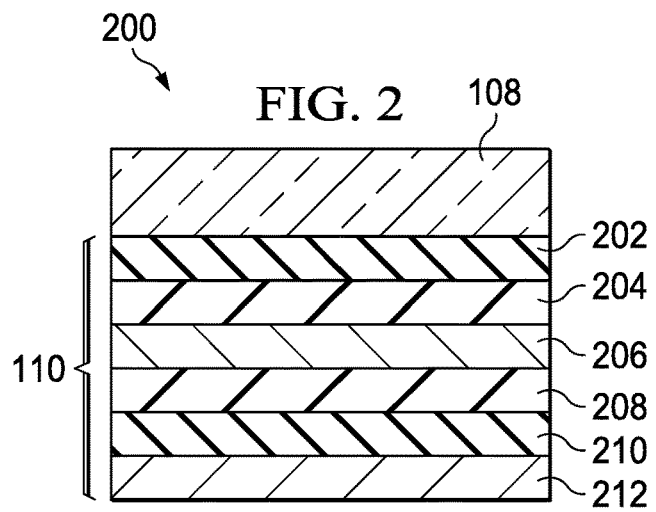
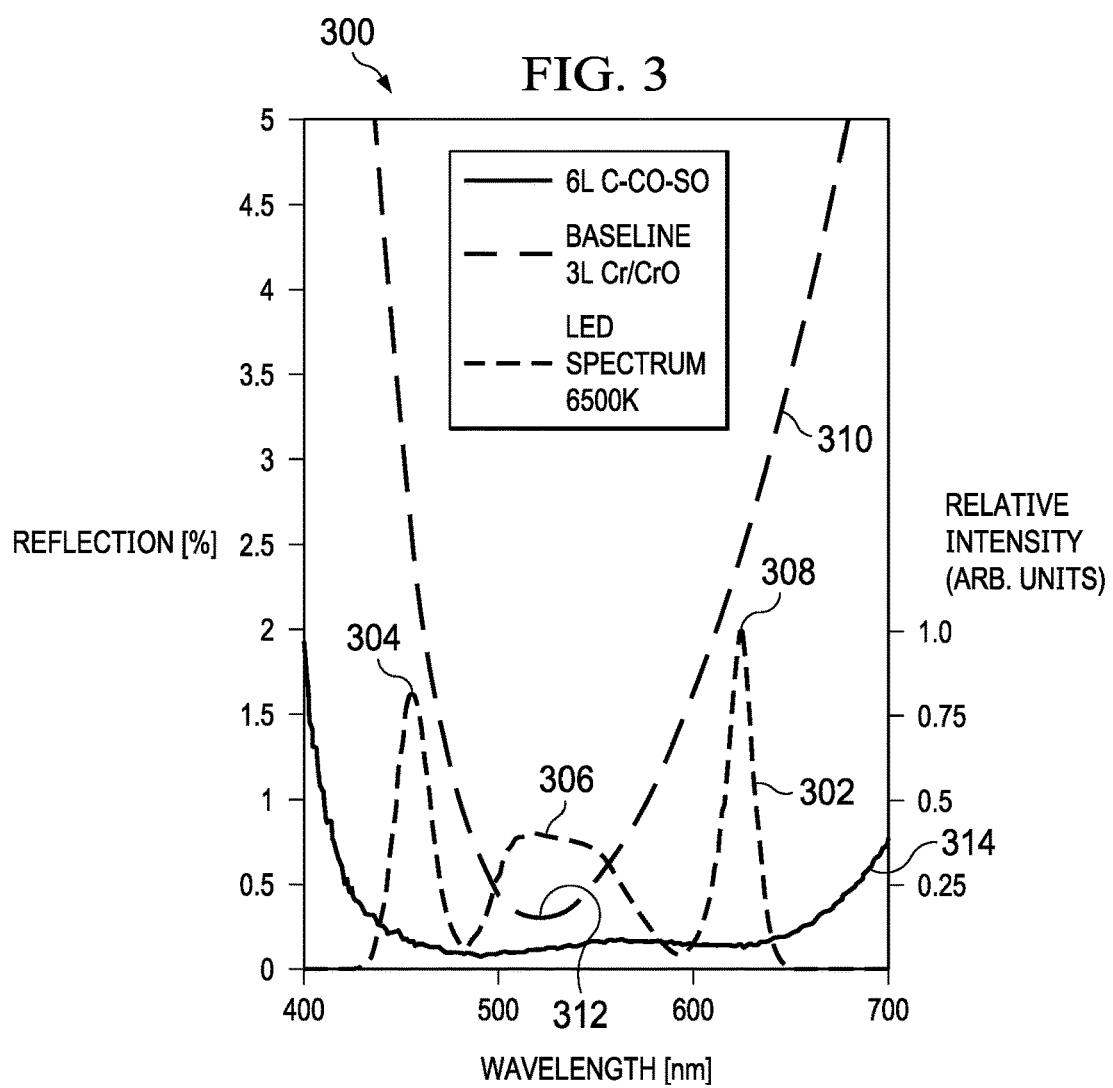

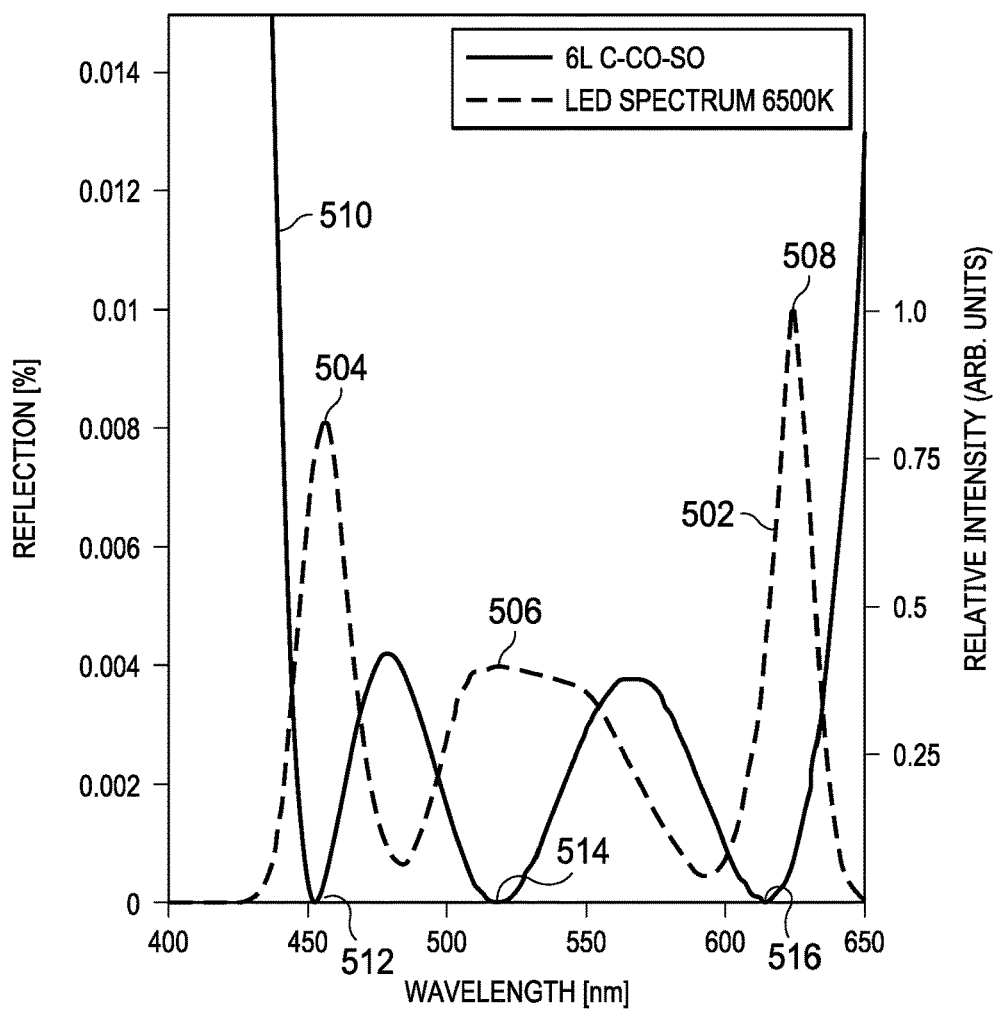

610 — RECEIVING BLUE LIGHT, GREEN LIGHT, AND RED LIGHT AT A DIGITAL MICROMIRROR DEVICE (DMD), WHEREIN THE DMD INCLUDES A WINDOW, THE WINDOW INCLUDING A WINDOW APERTURE COMPOSED OF A SIX-LAYER OPTICAL FILM STACK

620 — ABSORBING THE BLUE LIGHT, THE GREEN LIGHT, AND THE RED LIGHT BY THE SIX-LAYER OPTICAL FILM STACK, WHEREIN THE SIX LAYER OPTICAL FILM STACK HAS THREE REFLECTION MINIMUMS, A FIRST REFLECTION MINIMUM AT APPROXIMATELY A WAVELENGTH OF BLUE LIGHT, A SECOND REFLECTION MINIMUM AT APPROXIMATELY A WAVELENGTH OF GREEN LIGHT, AND A THIRD REFLECTION MINIMUM AT APPROXIMATELY A WAVELENGTH OF RED LIGHT

DARK MIRROR THIN FILMS

CROSS-REFERENCE TO RELATED APPLICATIONS

The present application claims priority to U.S. Provisional Patent Application No. 62/976,460, which was filed Feb. 14, 2020, is titled "Dark Mirror Thin Film," and is hereby incorporated herein by reference in its entirety.

SUMMARY

In accordance with at least one example of the description, a system includes an optical film stack, where the optical film stack includes a substrate and a first inorganic layer on the substrate. The optical film stack also includes a first dielectric layer on the first inorganic layer and a first metal layer on the first dielectric layer. The optical film stack also includes a second dielectric layer on the first metal layer and a second inorganic layer on the second dielectric layer. The optical film stack also includes a second metal layer on the second inorganic layer.

In accordance with at least one example of the description, a system includes a digital micromirror device (DMD) that includes an array of micromirrors. The system also includes a light shield at least partially surrounding the array of micromirrors. The system also includes a window at least partially covering the DMD and the light shield, where the window has a window aperture that includes an optical film stack. The optical film stack includes a substrate and a first inorganic layer on the substrate. The optical film stack also includes a first dielectric layer on the first inorganic layer and a first metal layer on the first dielectric layer. The optical film stack also includes a second dielectric layer on the first metal layer and a second inorganic layer on the second dielectric layer. The optical film stack also includes a second metal layer on the second inorganic layer.

In accordance with at least one example of the description, a method includes receiving blue light, green light, and red light at a digital micromirror device (DMD), where the DMD includes a window, the window including a window aperture composed of a six-layer optical film stack. The method also includes absorbing the blue light, the green light, and the red light by the six-layer optical film stack, where the six-layer optical film stack has three reflection minimums, a first reflection minimum at approximately a wavelength of blue light, a second reflection minimum at approximately a wavelength of green light, and a third reflection minimum at approximately a wavelength of red light.

BRIEF DESCRIPTION OF THE DRAWINGS

For a detailed description of various examples, reference will now be made to the accompanying drawings in which:

FIG. 2 is a cross-sectional view of a window aperture in accordance with various examples.

FIG. 3 is a graph of reflection curves in accordance with various examples.

FIG. 5 is a graph of reflection curves in accordance with various examples.

FIG. 6 is a flowchart of a method for receiving light at a digital micromirror device, in accordance with various examples.

DETAILED DESCRIPTION

Figure 1A:
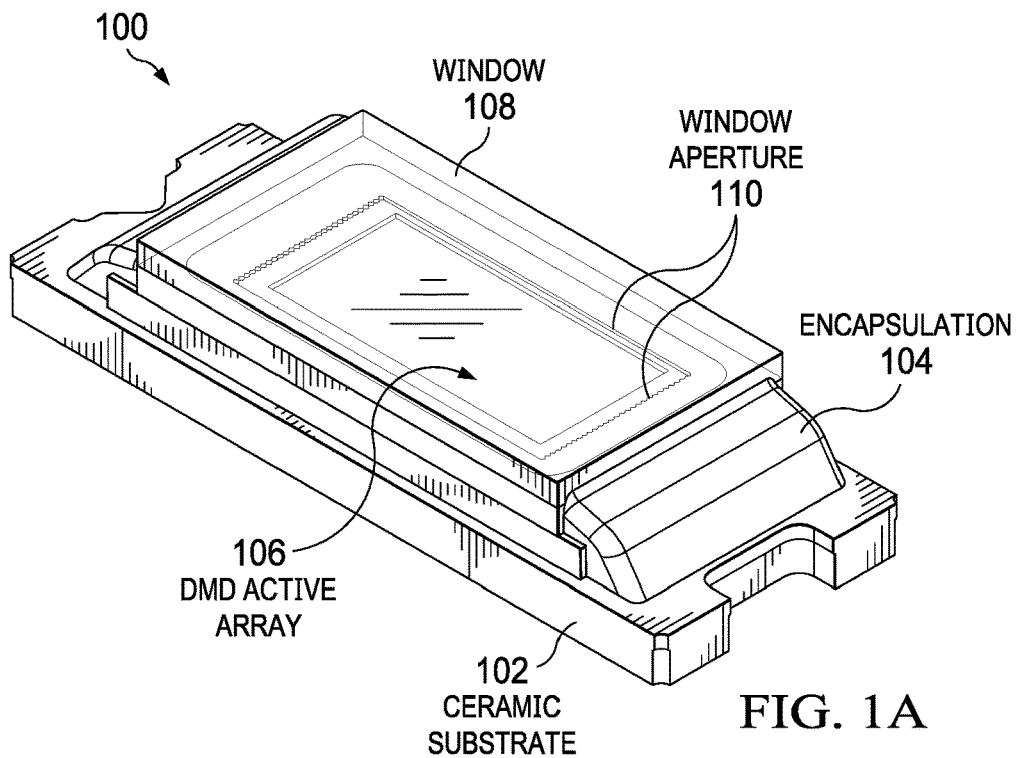
FIG. 1A is a schematic diagram of a digital micromirror device in accordance with various examples.
Figure 1B:
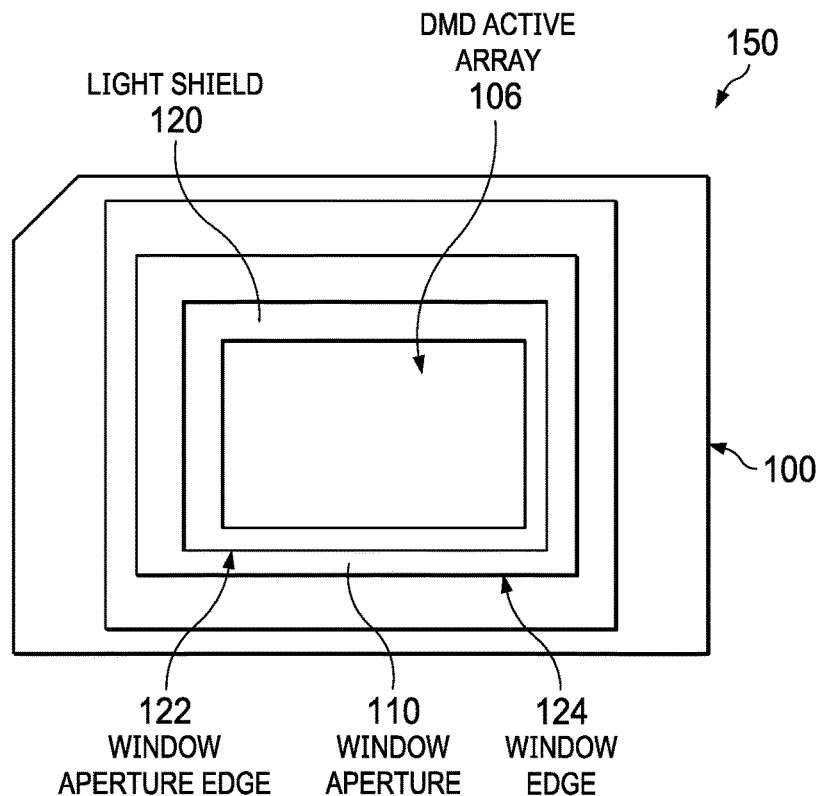
FIG. 1B is a schematic diagram of a digital micromirror device in accordance with various examples.

In optical systems, suppression of reflected light is important for optical quality. Optical systems where suppression of reflected light is useful can include spatial light modulators, mirrors, filters, lenses, displays, instrument control panels, touch screens, and virtual reality devices. One example optical system described herein is a digital micromirror device (DMD). A DMD is a micro-electrical-mechanical system (MEMS) that has on its surface an array of several hundred thousand or millions of microscopic mirrors, often made of aluminum. Each micromirror corresponds to a pixel in an image that is projected onto the micromirrors and then reflected from the micromirrors to a display. On the same plane as the array of micromirrors, there is an area around the array called a light shield or dark metal. The light shield area is designed to be dark for optical quality purposes. A window, generally made of glass, covers the array and the light shield. To prevent portions of the light shield from being seen through the window, the back surface of the window has a window aperture. In this description, the window aperture refers to the dark perimeter portion of the window that blocks light and outlines an opening in the window where light passes through. The window aperture is shown in FIGS. 1A and 1B below. The window aperture suppresses reflected light from the area around the micromirror array to prevent the reflected light from being captured by the projection optics, which can create unwanted optical artifacts.

The window aperture is made dark by using an aperture coating on the back surface of the window that absorbs light. This coating is called a dark mirror thin film. In some systems, the aperture coating includes a three-layer (3L) oxide stack. The 3L stack includes a thin chrome layer, then a thicker layer of chromium oxide ($CrO_x$), then a thick layer of chrome. This stack creates a mirror, and light that comes into the window reflects off of the mirror. This 3L stack can be made to appear dark, but the 3L stack only absorbs light centered at one wavelength. The 3L stack mainly removes green light from the reflection. Because the 3L stack removes green light, it reflects red and blue light and therefore it has a magenta color.

To improve contrast and make certain optical designs work better, a darker surface for the window aperture performs better than a lighter surface. To provide a darker surface, the window aperture does not have to absorb all light, but rather the window aperture should absorb the wavelengths of light that are sent into the window. In one example, an LED (light emitting diode) light source in a DMD has a red LED, a green LED, and a blue LED. A stack in accordance with examples herein is designed to be able to absorb red, green, and blue light at the peak wavelengths for each of those colors of light. Red light has a wavelength of approximately 635 to 700 nanometers (nm). Green light has a wavelength of approximately 520 to 560 nanometers. Blue light has a wavelength of approximately 450 to 490 nanometers. In other examples, a different light source may be used, such as a white light source with various filters or a blue LED with a phosphor and/or filters.

The optical film stack in accordance with examples herein uses an additional material in the optical film stack and has more layers than the 3L stack. The optimal film stack herein includes six layers (6L) rather than three layers. The 6L stack includes a layer of chromium oxide (CrO$_x$), then silicon dioxide (SiO$_2$), and then a first layer of chrome (Cr). The first layer of chrome is followed by another layer of SiO$_2$, then another layer of CrO$_x$, and finally a second layer of chrome. The 6L stack produces a reflection that is darker than the 3L stack. To produce the dark reflection, the thickness and the refractive index of each of the six layers are tuned to reflect or absorb light in a particular way. In examples herein, the layers are tuned to absorb light at the three primary wavelengths of red, green, and blue light. Absorbing light at these three wavelengths cancels a large part of the reflected light and makes the window aperture appear dark and color neutral. Examples herein are described with respect to a DMD, but other optical systems, such as those listed above, are also within the scope of this description.

FIG. 1A is a DMD 100 with a window and window aperture according to an example. At the bottom of DMD 100 is a ceramic substrate 102. The ceramic substrate 102 forms the mechanical, optical, thermal, and electrical interfaces between the DMD and the end-application optical assembly. In some examples, an optional encapsulation 104 protects bond wires on the DMD. DMD 100 has a DMD active array 106. DMD active array 106 includes the array of micromirrors for use in DMD applications. Window 108 is a clear glass cover that protects the micromirrors in the DMD active array 106. Window 108 is a substrate composed of borofloat glass in an example. Window aperture 110 is the dark coating on the inside surface of window 108 around the perimeter of DMD active array 106, and in a plane above DMD active array 106. In examples herein, window aperture 110 is a dark mirror thin film that includes the six layers described above.

FIG. 1B is an overhead view 150 of a DMD 100 according to an example. DMD 100 includes DMD active array 106. Surrounding DMD active array 106 is light shield 120. Light shield 120 is outside the DMD active array 106 but in the same plane as DMD active array 106.

DMD 100 also includes window aperture 110 surrounding light shield 120. Window aperture 110 is on the inside surface of window 108 (not shown in FIG. 1B). Window aperture 110 has an inside window aperture edge 122. Window edge 124 is an outside edge of window aperture 110, and window edge 124 is also the outside edge of window 108. In examples herein, window aperture 110 is a dark mirror thin film composed of six layers that absorb light at the three primary wavelengths of red, blue, and green light.

FIG. 2 is a cross-sectional view 200 of window 108 and window aperture 110. Window aperture 110 is a dark mirror thin film that has six layers 202, 204, 206, 208, 210, and 212. Layers 202 and 210 are inorganic layers, and are CrO$_x$ layers in one example. Chromium can form a number of different valence states, such as CrO$_2$, CrO$_3$, CrO$_5$, etc. Layers 202 and 210 can be formed of any suitable chromium oxide state or any combination of chromium oxide states. The six-layer optical film stack can be created by depositing the layers using any suitable deposition techniques. For example, physical vapor deposition can be used, including evaporation, magnetron sputtering, ion beam sputtering, or pulsed laser deposition. In another example, chemical vapor deposition (CVD) can be used, including atomic layer deposition, atmospheric pressure CVD, low pressure CVD, or plasma-enhanced CVD.

Layers 204 and 208 are dielectric layers, and are SiO$_2$ layers in one example. SiO$_2$ is a common layer material in optical coatings. Layers 206 and 212 are metal layers, and are composed of chrome in this example. The layers in the stack provide different refractive indexes, which allow the stack to be tuned to reflect or transmit the particular wavelengths. The refractive index of a material is a dimensionless number that describes how fast light travels through the material compared to how fast light travels through a vacuum. The vacuum has a refractive index of 1. Water has a refractive index of approximately 1.33, which means that light travels 1.33 times as fast in a vacuum as it travels in water. Chromium oxide has a refractive index around 2.5. Sift has a refractive index of around 1.5. Chrome has a refractive index of around 4.5. In this example, light is not only being transmitted and reflected but some light is absorbed as well. Chrome layers 206 and 212 are where most of the light is absorbed because those layers have a high absorption coefficient. The absorption coefficient describes the intensity attenuation of the light as it passes through a medium. The absorption coefficient determines how far light of a particular wavelength can penetrate into a material before the light is absorbed. In a material with a low absorption coefficient, light is poorly absorbed, and if the material is thin enough, it will appear transparent to light at that wavelength. The absorption coefficient depends on the material and also on the wavelength of light which is being absorbed.

The thin film stack as described herein is low reflectance and also low transmission. The thin film stack has an average transmission of <0.05% between the wavelengths of 420 and 680 nanometers. At a thickness of 100 nanometers, chrome layer 212 and this film stack can produce average transmission of nearly zero. A thinner chrome layer 212 would allow more transmission. For example, a 50-nanometer chrome layer 212 can be nearly as low reflection but will allow ~1% of light through the stack between the wavelengths of 420 and 680 nanometers.

The six layers of the thin film stack that constitute window aperture 110 can be described by their optical thicknesses. The optical thickness is the layer's geometric thickness multiplied by its refractive index. The optical thickness is also called the optical path length. In an example, layer 202 is the first layer of the six-layer stack and is a CrO$_x$ layer that has an optical thickness of 25.50 nanometers with a tolerance of approximately ±1.49 nanometers. In this example, CrO$_x$ has a refractive index of approximately 2.507 at a wavelength of 550 nanometers. The wavelength of green light is around 550 nanometers. An optical thickness of 25.5 nanometers in a material with a refractive index of 2.507 results in a layer with a geometric thickness of approximately 10.17 nanometers. CrO$_x$ has an extinction coefficient of 0.0864 at 550 nm. The extinction coefficient is an optical constant of the material, and is a measure of how easily a material can be penetrated by a beam of light at a particular wavelength.

In an example, the second layer, layer 204, is SiO$_2$ with an optical thickness of 44.14 nanometers with a tolerance of approximately ±3.06 nanometers. SiO$_2$ has a refractive index of approximately 1.466 at a wavelength of 550 nanometers. This optical thickness and refractive index results in layer 204 having a geometric thickness of approximately 30.11 nanometers. SiO$_2$ has an extinction coefficient of zero at 550 nm.

The third layer, layer 206, is Cr with an optical thickness of 14.32 nanometers with a range of approximately 12.5 to 40.0 nanometers. Thin Cr has a refractive index of approximately 4.114 (bulk or thick Cr has a different refractive index) at a wavelength of 550 nanometers. This optical thickness and refractive index results in layer 206 having a geometric thickness of approximately 3.48 nanometers. Thin Cr has an extinction coefficient of 4.427 at 550 nm.

The fourth layer, layer 208, is $SiO_2$ with an optical thickness of 76.23 nanometers with a tolerance of approximately ±5.15 nanometers. With a refractive index of approximately 1.466 at a wavelength of 550 nanometers, layer 208 has a geometric thickness of approximately 52.00 nanometers. $SiO_2$ has an extinction coefficient of zero at 550 nm.

In an example, the fifth layer, layer 210, is $CrO_x$ with an optical thickness of 54.45 nanometers with a tolerance of approximately ±2.13 nanometers. Because $CrO_x$ has a refractive index of approximately 2.507 at a wavelength of 550 nanometers, layer 210 has a geometric thickness of approximately 21.72 nanometers. $CrO_x$ has an extinction coefficient of 0.0864 at 550 nm.

The sixth layer, layer 212, is chrome. In an example, layer 212 has an index of approximately 2.86 at a wavelength of 550 nanometers. Layer 212 is approximately 100 nanometers in this example. Layer 212 can be thinner in other examples if it is opaque to 99.9%. Thick Cr has an extinction coefficient of 3.21 at 550 nm. A window aperture 110 that is made of the six layers with the optical thicknesses described above will produce a dark reflection as described herein.

FIG. 3 is a graph 300 of reflection curves in accordance with various examples. The x-axis of graph 300 plots the wavelength of light, measured in nanometers. The y-axis on the left side of graph 300 plots the reflection percentage, or reflectance. The reflectance is a measure of how much light is reflected at various wavelengths. The reflectance is plotted for curves 310 and 314 as described below. As described above, a window aperture 110 is designed to absorb light at certain wavelengths and therefore is programmed to have a low reflectance.

Graph 300 includes curve 302. Curve 302 is a graph of LED light at a color temperature of 6500K. The color temperature of a light source refers to the temperature of an ideal black body, which is a physical body that absorbs all incident electromagnetic radiation. The color temperature is the temperature of the black body that radiates light of a certain color, measured in kelvins (K). Natural daylight has a spectrum similar to that of a black body with a correlated color temperature of 6500K. LED light at 6500K will therefore emit light that approximates daylight.

The y-axis on the right side of graph 300 plots the relative intensity of curve 302, in arbitrary units. As described above, red light has a wavelength of approximately 635 to 700 nanometers, green light has a wavelength of approximately 520 to 560 nanometers, and blue light has a wavelength of approximately 450 to 490 nanometers. The peaks of curve 302 correspond to the wavelengths of red, green, and blue light, and their relative intensities in one example. For example, a peak of curve 302 at point 304 occurs at approximately 460 nanometers, which is the wavelength of blue light. Another peak of curve 302 at point 306 occurs at approximately 520 nanometers, which is the wavelength of green light. Another peak of curve 302 at point 308 occurs at approximately 635 nanometers, which is the wavelength of red light. Therefore curve 302 shows that LED light with a color temperature of 6500K has intensity peaks near the wavelengths of red, green, and blue light.

Curve 310 is a graph of the reflectance of a three-layer oxide stack with an anti-reflective (AR) coating. As described above, this three-layer stack only absorbs light centered at one wavelength, the wavelength of green light. The stack reflects red and blue light and has a magenta color. Curve 310 has a minimum that occurs at point 312. Point 312 is near the wavelength of green light (point 306). Curve 310 has a low reflectance of green light due to the minimum of the curve being at point 312. Curve 310 therefore absorbs green light, because a low reflectance indicates a high absorption. At the wavelengths associated with blue and red light (460 nanometers and 635 nanometers, respectively), the reflectance of curve 310 is much higher than at point 312. Therefore, red and blue light are not absorbed as much as green light but are instead reflected more, and the three-layer oxide stack has a magenta color.

Curve 314 is a graph of the resulting reflectance of a six-layer stack with an anti-reflective coating when LED light strikes the six-layer stack, in accordance with examples herein. The six-layer stack exhibits a much lower reflectance (and therefore a much higher absorption) than the three-layer stack of curve 310. With the six-layer stack, curve 314 shows that most of the LED light represented by curve 302 is absorbed, and therefore the six-layer stack has a low reflectance at the wavelengths of blue light, green light, and red light. At the wavelengths of blue light (460 nanometers), green light (520 nanometers), and red light (635 nanometers), the reflectance of the six-layer stack is below 0.25%. As shown in graph 300, the reflectance of the six-layer stack is lower than the reflectance of the 3-layer stack along the entire range of wavelengths shown in graph 300. Therefore, the six-layer stack absorbs more light and has a darker color than three-layer stacks. A window aperture 110 that utilizes the six-layer stack will also be color neutral because the six-layer stack has a low reflectance of each of red, green, and blue light.

Figure 4:
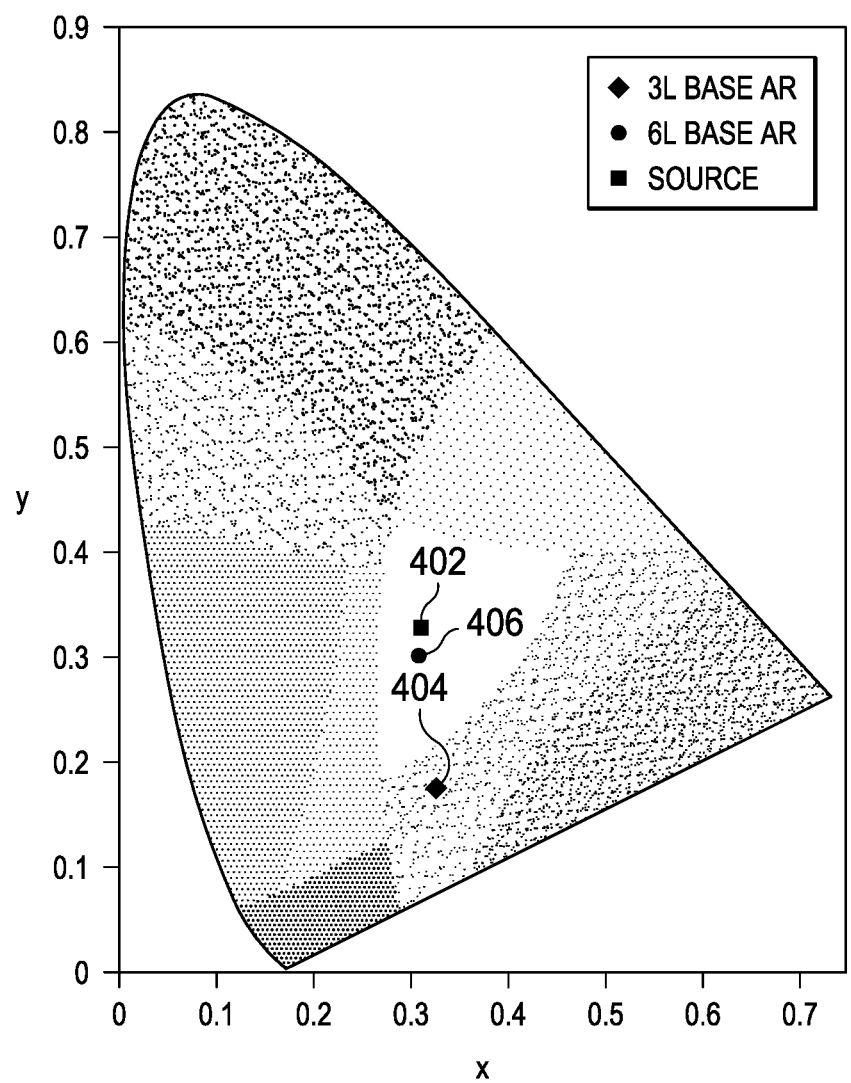
FIG. 4 is a diagram of points in a color space in accordance with various examples.

FIG. 4 is a graph 400 of a color diagram, which maps out color values that the human eye can see with x and y coordinates. In this example, the color values for red (x), green (y), and blue (z) total to 1 (e.g., x+y+z=1). The x-axis represents the red color value and the y-axis represents the green color value. If the red and green color values are determined from the (x,y) coordinates on the graph, the blue value can also be determined (e.g., z=1−x−y). In graph 400, green is located near the top of the graph, blue is found along the bottom left portion of the graph, and red is located near the bottom right of the graph. Point 402 in graph 400 is the white point, which is also called the color neutral point. The white point is the set of coordinates that defines the color white. Point 402 is approximately at the point where x=y=z=0.333. Point 404 is the point on the color diagram that represents the three-layer oxide stack. This three-layer oxide stack resides in the magenta region of graph 400 because the absorption of the three-layer oxide stack is centered near the wavelength of green light, and therefore the three-layer stack reflects red and blue light, appearing as magenta.

Point 406 is the point on the color diagram that represents the six-layer stack according to examples herein. Point 406 is much closer to point 402 (e.g., the color neutral point) than point 404 is. Therefore, a six-layer stack as described herein will appear closer to color neutral than the three-layer stack.

FIG. 5 is a graph 500 of a reflection curve of a six-layer stack in accordance with an example. The x-axis of graph 500 plots the wavelength of light, measured in nanometers. The y-axis on the left side of graph 300 plots the reflectance of the six-layer stack, measured in percentage.

Curve 502 is a graph of LED light at a color temperature of 6500K. The y-axis on the right side of graph 500 plots the relative intensity of curve 502, in arbitrary units. Curve 502 is similar in shape to curve 302 above in FIG. 3. As with curve 302, the peaks of curve 502 correspond to the wavelengths of red, green, and blue light, and their relative intensities in one example. For example, a peak of curve 502 at point 504 occurs at approximately 460 nanometers, which is the wavelength of blue light. Another peak of curve 502 at point 506 occurs at approximately 520 nanometers, which is the wavelength of green light. Another peak of curve 502 at point 508 occurs at approximately 620 nanometers, which is the wavelength of red light. Therefore curve 502 shows that LED light with a color temperature of 6500K has intensity peaks near the wavelengths of red, green, and blue light.

Curve 510 is a graph of the theoretical reflectance curve of the six-layer stack according to an example. The materials and the optical thicknesses of the layers in the six-layer stack are tuned to have a reflectance curve that corresponds to curve 510. Curve 510 has three reflection minima, which are designed to occur at or near the wavelengths of red, green, and blue light. These three reflection minima therefore cause the six-layer stack to absorb light at the red, green, and blue wavelengths and produce a dark and color neutral reflection.

Curve 510 includes a first reflection minimum at point 512, which is approximately 460 nanometers, or the wavelength of blue light. A six-layer stack that has a reflection minimum at this point will absorb almost all blue light as shown by the reflection percentage being near zero at point 512.

Curve 510 includes a second reflection minimum at point 514, which is approximately 520 nanometers, or the wavelength of green light. A six-layer stack that has a reflection minimum at this point will absorb almost all green light as shown by the reflection percentage being near zero at point 514.

Curve 510 includes a third reflection minimum at point 516, which is approximately 620 nanometers, or the wavelength of red light. A six-layer stack that has a reflection minimum at this point will absorb almost all red light as shown by the reflection percentage being near zero at point 516.

A six-layer stack according to an example that has a reflection curve similar to curve 510 will absorb red, green, and blue light and produce a dark and color neutral reflection. When a six-layer stack with a reflection curve similar to curve 510 receives LED light at a color temperature of 6500K (represented as curve 502), the light that is reflected by the six-layer stack is shown as curve 314 in FIG. 3. Curve 314 is therefore a combination of LED light (represented by curve 502) striking the six-layer stack (represented by curve 510), with the LED light being mostly absorbed across the plotted wavelengths. In other words, when LED light with peaks at points 504, 506, and 508 strikes a six-layer stack with reflection minima at points 512, 514, and 516, the reflection minima absorb much of the light at those peaks, reflecting only a small amount of light at the wavelengths of each of those three peaks. The resulting reflection from the six-layer stack, after the light at the peak wavelengths has been absorbed by the six-layer stack, is represented by curve 314. Curve 314 in FIG. 3 is dark (e.g., the curve 314 has a low reflection percentage along the visible wavelength) and color neutral (e.g., the curve is relatively flat along the visible wavelength, with no peaks corresponding to specific wavelengths). Therefore, curve 314 shows that a six-layer stack with a reflection curve similar to curve 510 will mostly absorb LED light represented by curve 502.

FIG. 6 is a flowchart of an example method 600 for receiving light at a DMD. Although the method steps are described in conjunction with FIGS. 1A-5, any system configured to perform the method steps, in any suitable order, is within the scope of this description.

Method 600 begins at step 610 where a DMD receives blue light, green light, and red light. The DMD includes a window, the window including a window aperture composed of a six-layer optical film stack. The blue light, green light, and red light may be produced by blue, green, and red LEDs, respectively. In an example, the DMD is DMD 100 shown in FIG. 1A.

Method 600 continues at step 620, where the six-layer optical film stack absorbs the blue light, green light, and red light. The six-layer optical film stack has three reflection minimums. The first reflection minimum is at approximately the wavelength of blue light, or 460 nanometers. The second reflection minimum is at approximately the wavelength of green light, or 520 nanometers. The third reflection minimum is at approximately the wavelength of red light, or 620 nanometers. These wavelength minima are shown on curve 510 in FIG. 5.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

While certain components may be described herein as being of a particular process technology, these components may be exchanged for components of other process technologies. Unless otherwise stated, "about," "approximately," or "substantially" preceding a value means +/−10 percent of the stated value. Modifications are possible in the described examples, and other examples are possible within the scope of the claims.

What is claimed is:

1. A system, comprising:
    an optical film stack comprising:
        a substrate;
        a first inorganic layer on the substrate;
        a first dielectric layer on the first inorganic layer;
        a first metal layer on the first dielectric layer;
        a second dielectric layer on the first metal layer;
        a second inorganic layer on the second dielectric layer; and
        a second metal layer on the second inorganic layer, wherein the optical film stack has three reflection minimums, a first reflection minimum at a wavelength of blue light, a second reflection minimum at a wavelength of green light, and a third reflection minimum at a wavelength of red light.

2. The system of claim 1, wherein the first inorganic layer comprises chromium oxide, the first dielectric layer comprises silicon dioxide, the first metal layer comprises chrome, the second inorganic layer comprises chromium oxide, the second dielectric layer comprises silicon dioxide, and the second metal layer comprises chrome.

3. The system of claim 1, wherein the first inorganic layer has an optical thickness between 24.01 and 26.99 nanometers.

4. The system of claim 1, wherein the first dielectric layer has an optical thickness between 41.08 and 47.21 nanometers.

5. The system of claim 1, wherein the first metal layer has an optical thickness between 12.5 and 40.0 nanometers.

6. The system of claim 1, wherein the second dielectric layer has an optical thickness between 68.68 and 83.78 nanometers.

7. The system of claim 1, wherein the second inorganic layer has an optical thickness between 49.11 and 59.79 nanometers.

8. The system of claim 1, wherein the optical film stack has a reflection minimum at a wavelength of approximately 670 nanometers.

9. The system of claim 1, wherein the optical film stack has a reflection minimum at a wavelength of approximately 540 nanometers.

10. The system of claim 1, wherein the optical film stack has a reflection minimum at a wavelength of approximately 470 nanometers.

11. The system of claim 1, wherein the first inorganic layer has a first refractive index, the first dielectric layer has a second refractive index, and the first metal layer has a third refractive index, wherein the first refractive index is greater than the second refractive index and the third refractive index is greater than the second refractive index.

12. A system, comprising:
a digital micromirror device (DMD) that includes an array of micromirrors;
a light shield at least partially surrounding the array of micromirrors; and
a window at least partially covering the DMD and the light shield, wherein the window has a window aperture that includes an optical film stack, the optical film stack including:
a substrate;
a first inorganic layer on the substrate;
a first dielectric layer on the first inorganic layer;
a first metal layer on the first dielectric layer;
a second dielectric layer on the first metal layer;
a second inorganic layer on the second dielectric layer; and
a second metal layer on the second inorganic layer, wherein the optical film stack has three reflection minimums, a first reflection minimum at a wavelength of blue light, a second reflection minimum at a wavelength of green light, and a third reflection minimum at a wavelength of red light.

13. The system of claim 12, wherein the first inorganic layer comprises chromium oxide, the first dielectric layer comprises silicon dioxide, the first metal layer comprises chrome, the second inorganic layer comprises chromium oxide, the second dielectric layer comprises silicon dioxide, and the second metal layer comprises chrome.

14. The system of claim 12, wherein the first inorganic layer has an optical thickness between 24.01 and 26.99 nanometers.

15. The system of claim 12, wherein the first dielectric layer has an optical thickness between 41.08 and 47.21 nanometers.

16. The system of claim 12, wherein the first metal layer has an optical thickness between 12.5 and 40.0 nanometers.

17. The system of claim 12, wherein the second dielectric layer has an optical thickness between 68.68 and 83.78 nanometers.

18. The system of claim 12, wherein the second inorganic layer has an optical thickness between 49.11 and 59.79 nanometers.

19. A method, comprising:
receiving blue light, green light, and red light at a digital micromirror device (DMD), wherein the DMD includes a window, the window including a window aperture composed of an optical film stack; and
absorbing the blue light, the green light, and the red light by the optical film stack, wherein the optical film stack has three reflection minimums, a first reflection minimum at a wavelength of blue light, a second reflection minimum at a wavelength of green light, and a third reflection minimum at a wavelength of red light, wherein the optical film stack comprises:
a first inorganic layer on a substrate;
a first dielectric layer on the first inorganic layer;
a first metal layer on the first dielectric layer;
a second dielectric layer on the first metal layer;
a second inorganic layer on the second dielectric layer; and
a second metal layer on the second inorganic layer.

20. The method of claim 19, wherein the first inorganic layer comprises chromium oxide with an optical thickness between 24.01 and 26.99 nanometers, the first dielectric layer comprises silicon dioxide with an optical thickness between 41.08 and 47.21 nanometers, and the first metal layer comprises chrome with an optical thickness between 12.5 and 40.0 nanometers.

* * * * *